United States Patent [19]
Lo

[11] Patent Number: 5,457,972
[45] Date of Patent: Oct. 17, 1995

[54] ANTI-THEFT DEVICE FOR AUTOMOBILE

[76] Inventor: Tzung-I Lo, P.O. Box 96-405, Taipei, Taiwan, 10098

[21] Appl. No.: 157,660

[22] Filed: Nov. 26, 1993

[51] Int. Cl.⁶ .................................................. B60L 25/02
[52] U.S. Cl. ............................ 70/209; 70/226; 70/417
[58] Field of Search ........................... 70/417, 209, 211, 70/212, 225, 226, 237, 238

[56] References Cited

U.S. PATENT DOCUMENTS

| | | | |
|---|---|---|---|
| 1,448,658 | 3/1923 | Furber | 70/209 |
| 4,464,915 | 8/1984 | Moshe et al. | 70/417 |
| 4,829,797 | 5/1989 | Wu | 70/211 |
| 5,005,388 | 4/1991 | Lo | 70/209 |
| 5,052,201 | 10/1991 | Liou | 70/226 |
| 5,069,048 | 12/1991 | Lo | 70/226 |
| 5,168,732 | 12/1992 | Chen et al. | 70/209 |
| 5,197,308 | 3/1993 | Pazik | 70/226 |
| 5,211,041 | 5/1993 | Hsu | 70/209 |
| 5,255,544 | 10/1993 | Wu | 70/417 |
| 5,284,037 | 2/1994 | Chen et al. | 70/209 |
| 5,299,438 | 4/1994 | Chen | 70/226 |
| 5,375,441 | 12/1994 | Liou | 70/209 |

*Primary Examiner*—Darnell M. Boucher
*Attorney, Agent, or Firm*—Bacon & Thomas

[57] ABSTRACT

An anti-theft device for locking up the steering wheel of an automobile; the device has a locking rod, of which one end is welded to the center of a symmetrical locking hook, while the other end thereof is inserted into a lock rod groove of a casing portion. The casing position has a locking assembly to prevent the locking rod from moving unintentionally. One side of the casing portion is fastened with a L-shaped locking plate facing the locking hook. The symmetrical locking hooks is used to hold the spoke of a steering wheel. The L-shaped locking plate can be moved by pushing the casing portion until holding the grip wheel of a steering wheel so as to prevent a car from being stolen.

10 Claims, 11 Drawing Sheets

ANTI-THEFT DEVICE FOR AUTOMOBILE

BACKGROUND OF THE INVENTION

1. Field of the Invention

This invention relates to an anti-theft device for automobile, and particularly to a hook lock, which can be locked around the grip wheel and spoke of a steering wheel of car.

2. Description of the Prior Art

A conventional anti-theft device for automobile, such as a U.K. Patent No. 1,127,524, is used for locking up a cross-shaped steering wheel. The lock device comprises a beam 1, a bar 4 and a locking device 5; the locking device is used to control the fastening relation between the beam 1 and the bar 4. The bottom sides of the beam and bar are provided with forked lugs 2 and 3 respectively. After the device is locked up a steering wheel of car, the forked lugs will lock around the rim and spoke of the steering wheel.

A typical anti-theft device for road vehicles, such as a U.S. Pat. No. 3,245,239, comprises two extension pipe members, a lock being mounted between the two pipe members to control the operation thereof. Each of the two pipe members has a hook; such hooks are mounted around the pedal 131 and the spoke of a steering wheel; the lock is used for controlling the extension of the two pipe members so as to limit or control the accelerator and the steering wheel of a car.

Another conventional anti-theft lock for automobile, such as a U.S. Pat. No. 4,738,127 is an improved steering wheel lock for various types of steering wheels; such anti-theft lock comprises a lock block, a hollow tube and a rod member. One end of the lock block is connected with the hollow tube; the lock block has a passage for receiving the rod member. The passage is in communication with the hollow tube. A lock means mounted in the lock block is used for controlling the connection relation between the rod member and the lock block. Both the hollow tube and the rod member are provided with hooks respectively. Such two hooks can be held against the rim of a steering wheel after being pulled outwards, and then the lock means in the lock block will be set at a position to control the rod member and the hollow tube at a given position.

The locking function of the conventional steering wheel locks is limited as a result of the various styles and forms of the steering wheels, and therefore the locking function and anti-theft result are usually unable to expect. The grip wheel of a steering wheel is usually made of a rigid substance, and covered with a resilient foam rubber, which is then covered with a plastic substance or a leather for decoration purpose. Such a grip wheel can easily be cut with a saw to remove a steering wheel lock thereon, and then a burglar can easily drive the car away by steering the hub portion of the steering wheel.

SUMMARY OF THE INVENTION

This invention relates to a new anti-theft device for automobile, and the prime object thereof is to provide a device, which has a symmetrical L-shaped hooks and a L-shaped locking plate to lock around the two sides of the spoke and the grip wheel portions of a steering wheel so as to prevent a steering wheel from being cut with a saw, and to prevent a car from being stolen.

A further object of the present invention is to provide an automobile anti-theft device, of which the upper and lower casings are furnished with a positioning groove and a lock rod groove; the positioning groove is used for positioning one end of an elongate oblong rod, while the lock rod groove is used as a passage for a locking rod to move back and forth; such passage extends into the elongate oblong rod. One end of the casing portion is fastened with a L-shaped locking plate by means of screws. The locking rod in the lock rod groove is welded to a symmetrical L-shaped hooks at one end thereof; the space between the symmetrical L-shaped hooks is wider than the width of the horizontal side of the L-shaped locking plate. After the anti-theft device being mounted on a steering wheel, the symmetrical L-shaped hooks will hold the two sides of the spoke of a steering wheel; then, move the hooks outwards slightly to have L-shaped hooks held around the grip wheel perpendicular to the spoke; then, the L-shaped locking plate is moved to the grip wheel until the horizontal side of the L-shaped locking plate resting under the grip wheel, i.e., the grip wheel on both sides of the spoke of a steering wheel will be held around with the symmetrical L-shaped hooks, the L-shaped locking plate and the locking rod to provide an anti-theft function.

A still further object of the present invention is to provide an automobile anti-theft device, of which the upper and lower casings are furnished with a lock rod groove and a positioning groove; in the positioning groove, two symmetrical positioning ribs are provided; one end of the elongate oblong rod is furnished with two symmetrical retaining grooves; the elongate oblong rod is fixedly mounted in the upper and lower casings by means of the symmetrical retaining grooves. The lock rod groove has two parallel sides and two symmetrical curved sides; the lock rod groove serves as a passage of the locking rod to move back and forth, and the passage extends into the elongate oblong rod. In the upper casing and above the lock rod groove, there is a guide groove and a cylinder base, which are used as an assembly to control the locking function between the locking rod and the casing portion.

Another object of the present invention is to provide an automobile anti-theft device, of which a locking assembly is mounted in a guide groove in the upper casing above the lock rod groove; the guide groove is designed in a shape to fit the round-shaped latch, of which the top is a flat surface, while the lower end is provided with a plurality of stop teeth that include an anti-theft tooth in the front thereof, and a positioning tooth in the rear thereof. The anti-theft tooth has a curved bevel side of 45 degrees, which is to engage with the bevel side of the locking groove on the locking rod. The rear side of the anti-theft tooth is a vertical side to be engaged with the vertical side of the locking groove. The front side of the positioning tooth is a bevel side of 45 degrees to be engaged with the bevel side of the locking groove, while the vertical side thereof is to be engaged with the vertical side of the locking groove, and therefore such teeth can provide a perfect anti-theft function between the locking assembly and the locking rod.

Still another object of the present invention is to provide an automobile anti-theft device, of which the upper and lower casings can be assembled together by using a plurality of rivets and riveting holes on both sides thereof. Before the upper and lower casings are riveted together, two anti-drilling plates have to be fitted in two grooves on both sides of the casing portion respectively. After the upper and lower casings are riveted together, both sides thereof will have a perfect anti-drilling function.

Yet another object of the present invention is to provide an automobile anti-theft device, of which the locking rod is a round solid rod having two symmetrical parallel sides, and two symmetrical curved top and bottom sides; one end of the locking rod is welded to the center of two symmetrical L-shaped hooks, while the other end thereof is put through a lock rod groove in the casing portion, and extended inside the elongate oblong rod. The top side of the locking rod is provided with a plurality of locking grooves under the casing portion; each of the locking grooves has a one-way bevel side; the anti-theft device can control the locking condition by means of the locking assembly to be engaged with the locking grooves.

Yet still another object of the present invention is to provide an automobile anti-theft device, of which the locking rod is an elongate oblong hollow rod; a rod passage is furnished between the upper and lower casings for receiving the elongate oblong hollow rod to move back and forth; the top side of the oblong hollow rod is furnished with a plurality of locking grooves opposite to the stop teeth of the locking assembly.

A yet further object of the present invention is to provide an automobile anti-theft device, of which the locking rod has two symmetrical parallel sides and two symmetrical curved top and bottom sides, and extends a suitable length through a passage formed between the upper and lower casings so as to provide a locking function between the locking rod and the casing portion upon being moved at a suitable position.

A yet still further object of the present invention is to provide an automobile anti-theft device, of which a reinforced press-plate is welded under the joint part of the locking rod and the locking hook, but under and within the upper lateral rod of the locking hook so as to reinforce the anti-sawing strength of a steering wheel.

Again a yet still further object of the present invention is to provide an automobile anti-theft device, of which a reinforced press-plate is welded under the joint part of the locking rod and the locking hook, but under and within the upper lateral rod of the locking hook; the reinforced press-plate extends out of the upper lateral rod of the locking hook at a suitable length so as to provide a better anti-sawing strength for a steering wheel upon the device being fastened to the spoke of a steering wheel.

DETAILED DESCRIPTION OF THE PREFERRED EMBODIMENTS

Figure 1:
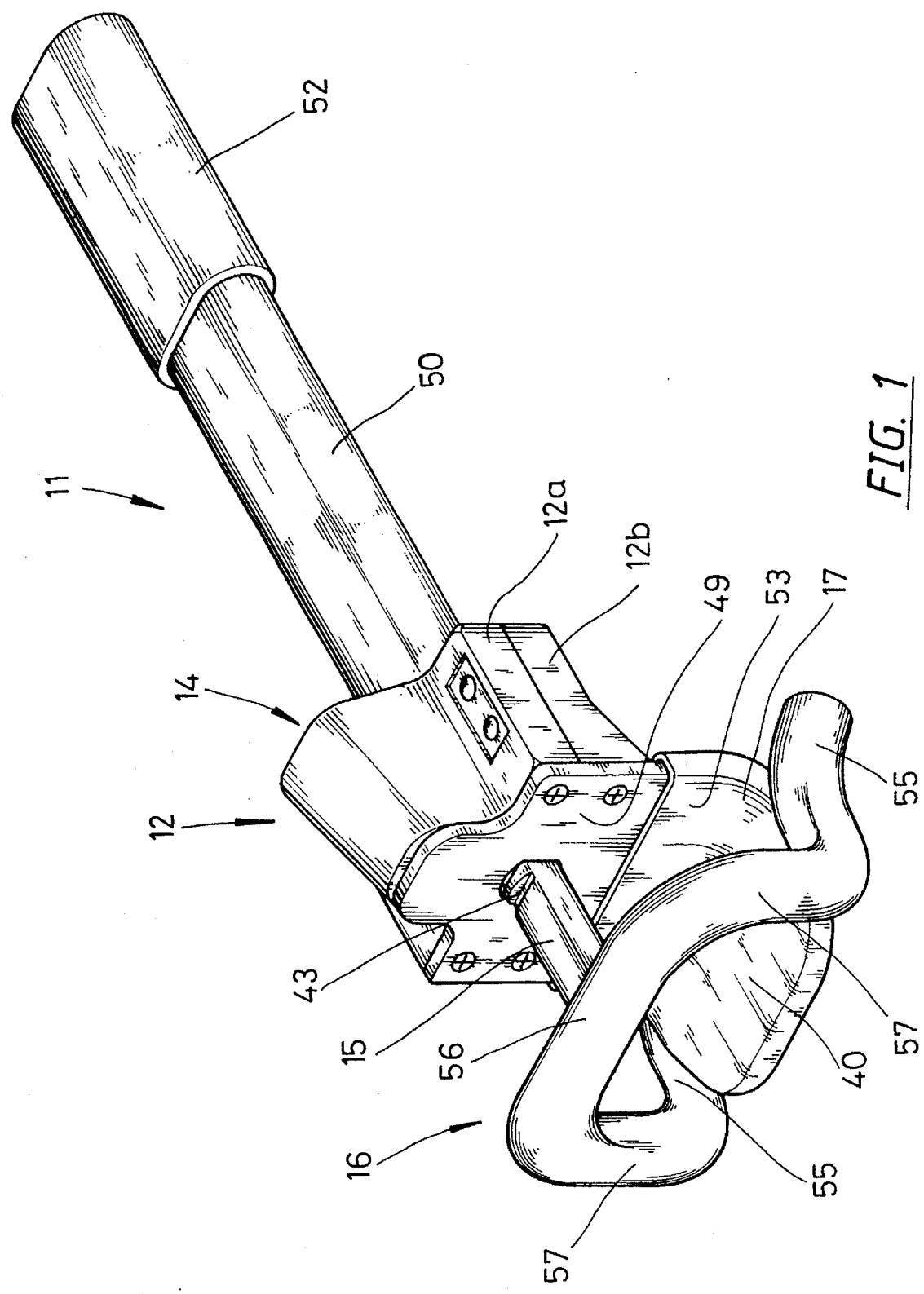
FIG. 1 is a perspective view of an embodiment according to the present invention.
Figure 2:
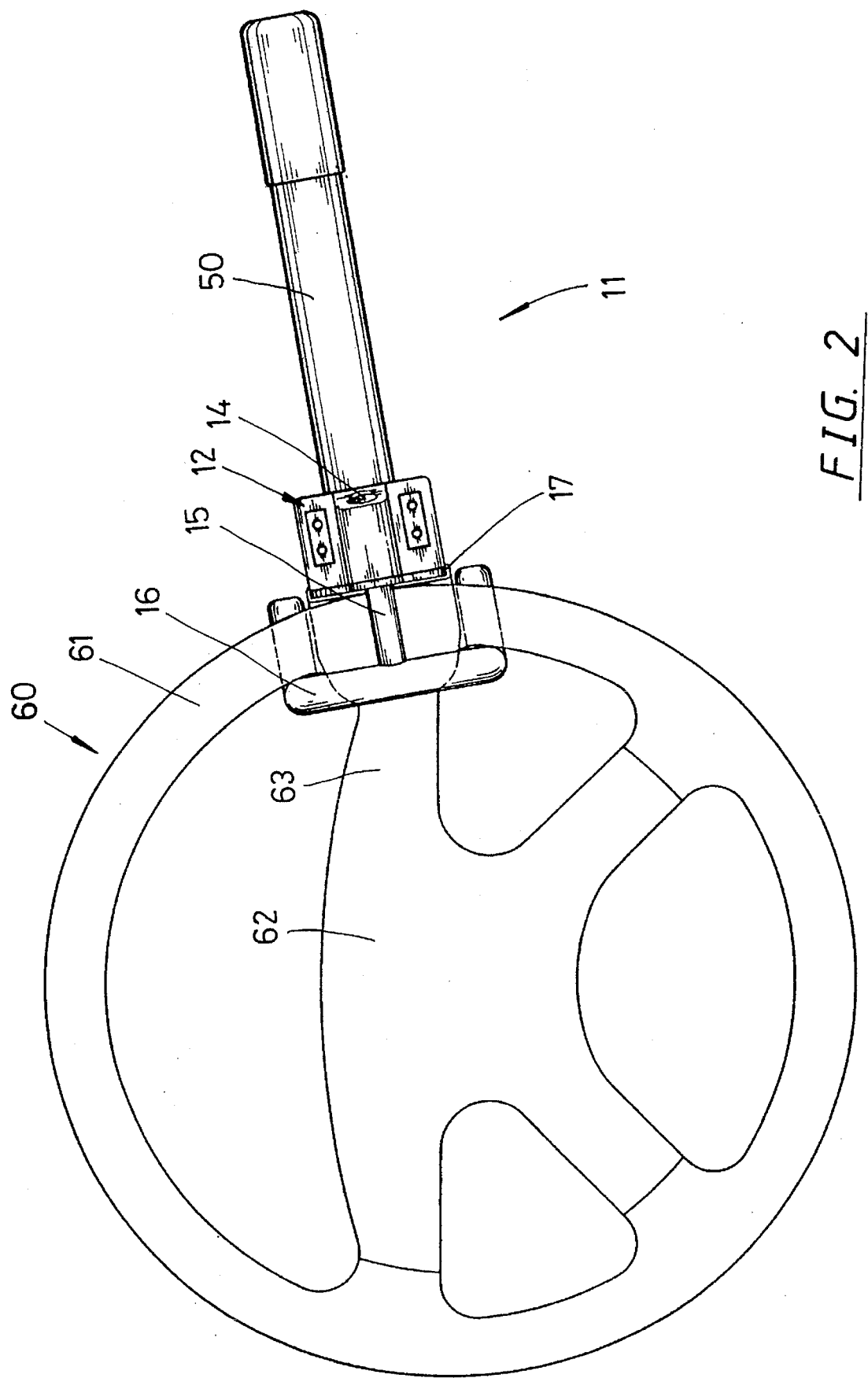
FIG. 2 is a top view of the present invention, being mounted on a steering wheel.
Figure 3:
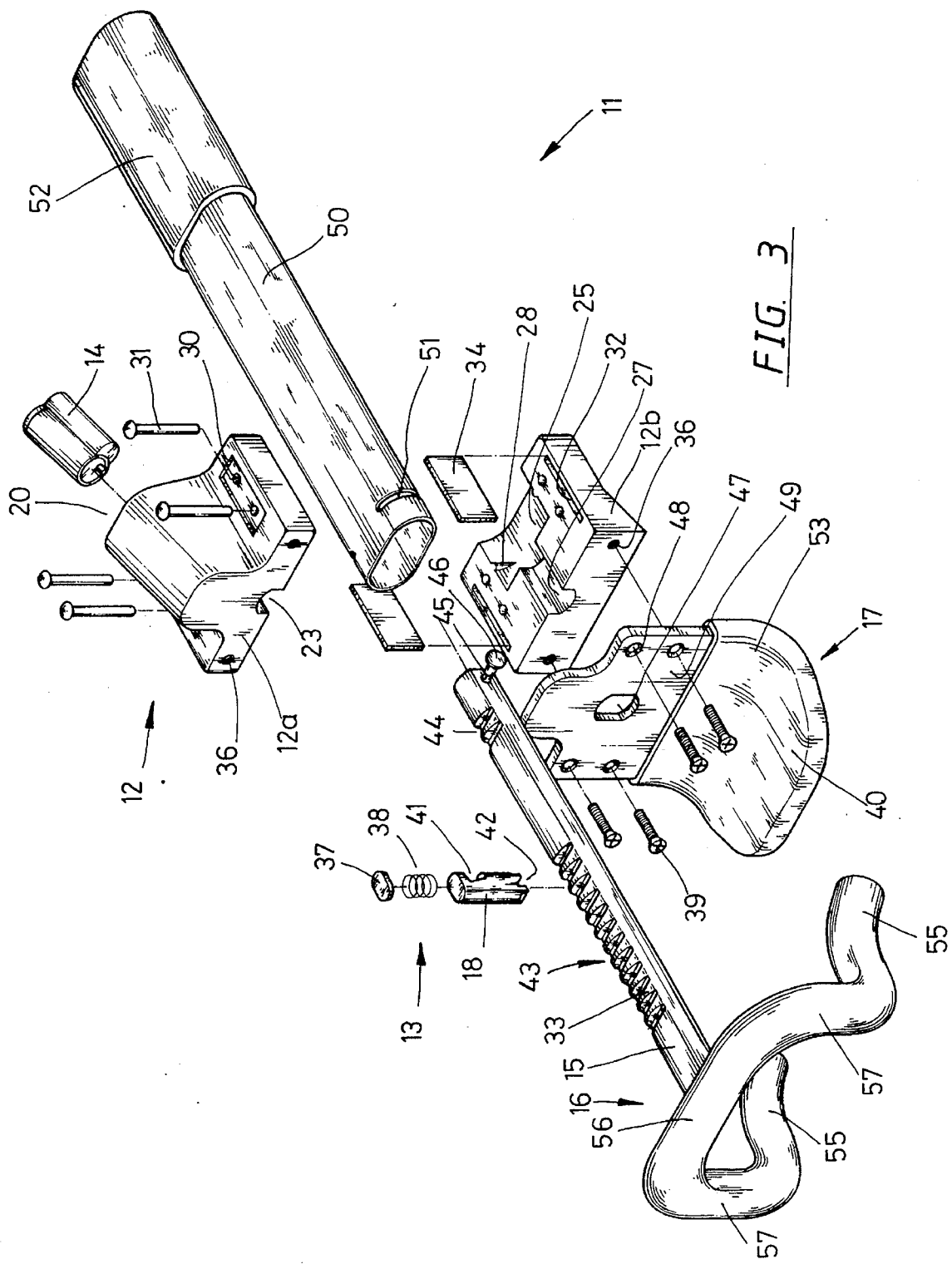
FIG. 3 is a disassembled view of the present invention.
Figure 4:
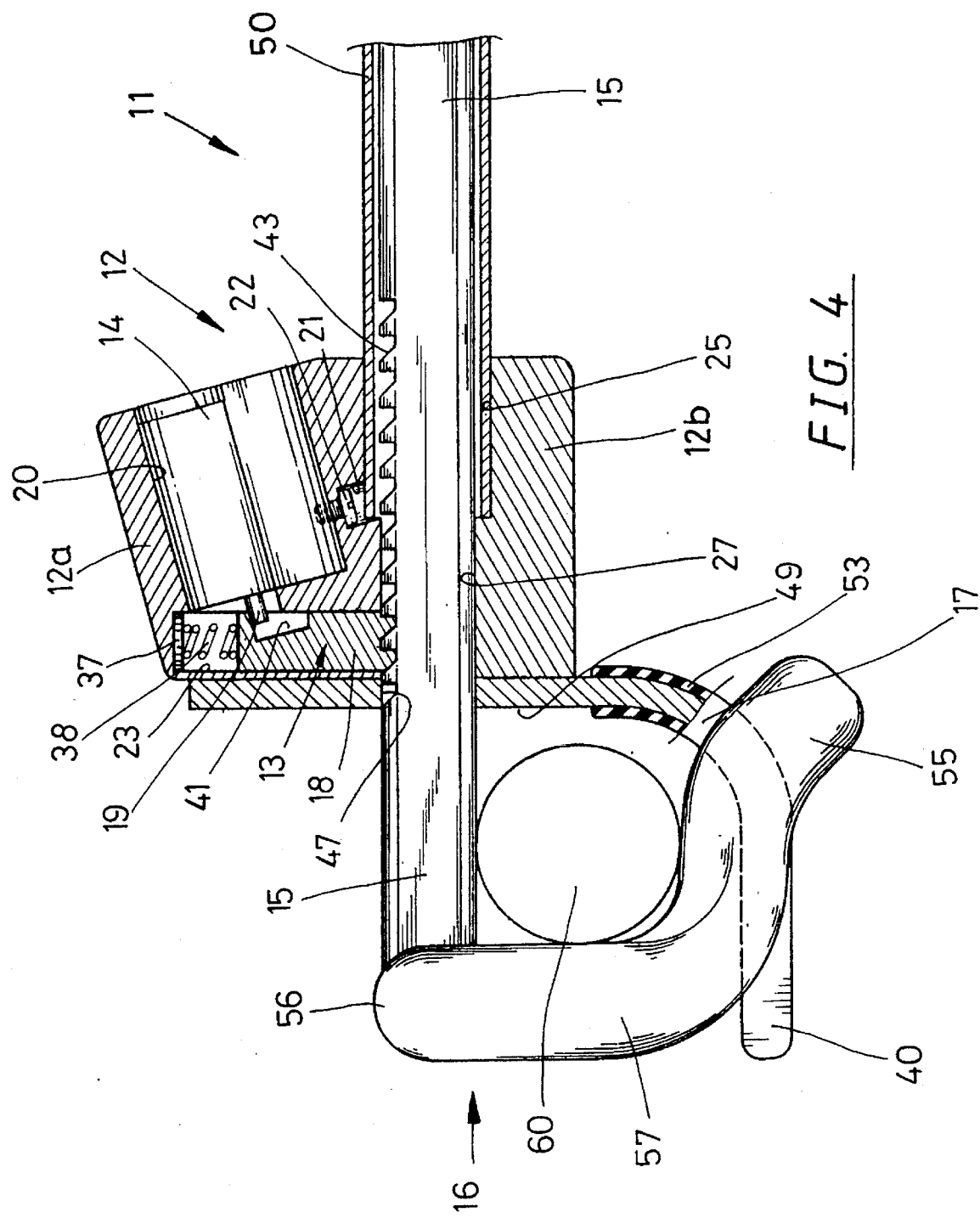
FIG. 4 is a sectional view of the present invention, upon being locked up to a steering wheel.
Figure 5:
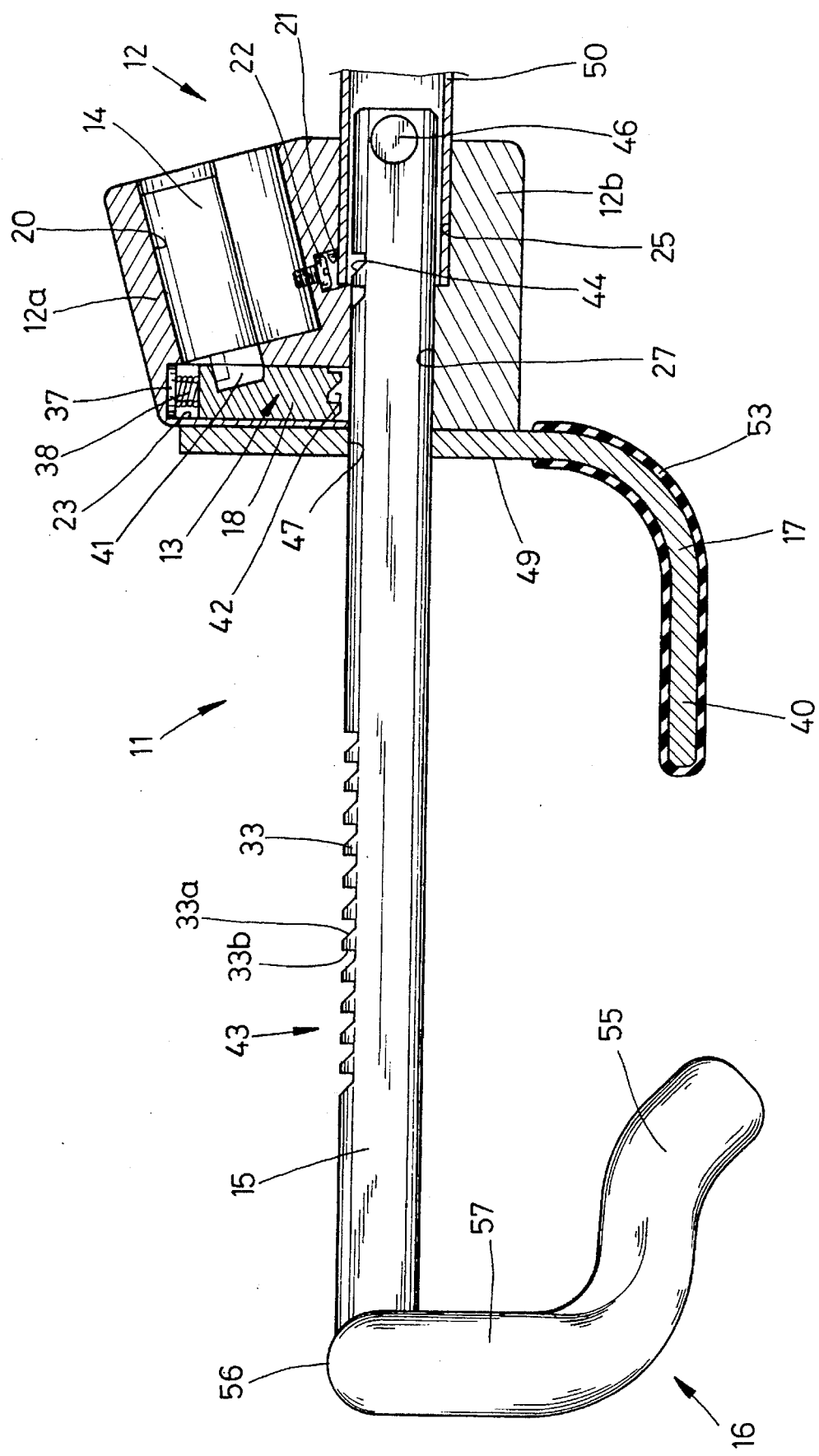
FIG. 5 is a sectional view of the present invention, upon being unlocked.

Referring to FIGS. 1 to 3, an anti-theft device 11 for an automobile according to the present invention comprises a casing portion 12, an enlongate oblong rod 50, a locking rod 15, a locking hook 16, and a L-shaped locking plate 17. Between the locking rod 15 and the casing portion 12, there are a locking assembly 13 and a lock cylinder 14 being used as a locking means to control the latch 18 and the locking rod 15. After the anti-theft device 11 locks up a steering wheel of a car, the symmetrical L-shaped hook 16 on the end of the locking rod 15 will be mounted around both sides of the spoke 63 and the grip wheel 61 of the steering wheel; simultaneously, the outer hook 55 of the L-shaped hook 17 will hold to the lower side of the grip wheel 61, while the upper lateral rod 56 will hold the upper side of the spoke 63; the side- vertical rod 57 will hold both sides of the spoke 63; the locking rod 15 will extend from the center of the spoke 63 to the top side of the grip wheel 61. The casing portion 12 can be moved to the steering wheel 60 along the locking rod 15 so as to have the horizontal side 40 of L-shaped locking plate 17 on the casing portion 12 fastened to the bottom side of the grip wheel 61 of the steering wheel 60, i.e., to have locking assembly 13 in the casing portion 12 and the locking groove 43 locked together. After the spoke 63 is locked up with the anti-theft device 11, the movement of the steering wheel 60 is limited, and the steering wheel would not be cut by a theft with a saw.

As shown in FIGS. 1, 3 to 5, the casing portion 12 of the anti-theft device 11 includes an upper casing 12A and a lower casing 12B, both of which are provided with two symmetrical positioning grooves 25 and lock rod grooves 27 respectively. The positioning groove 25 is used for fitting the elongate oblong rod 50; in order to fasten the elongate oblong rod 50 in place, two symmetrical positioning ribs 28 are provided on both sides of the positioning groove 25. The lock rod groove 27 has two parallel sides and a curved side. As soon as the upper and lower casings 12A and 12B are assembled together, a passage for the locking rod 15 is formed. Both sides of the upper and lower casings 12A and 12B are furnished with symmetrical riveting holes 30 respectively; two symmetrical grooves 32 are furnished outside of the riveting holes 30 respectively for receiving the corresponding anti-drilling plates 34 so as to provide the upper and lowering casings 12A and 12B with an anti-drilling function upon the two casing 12A and 12B being assembled together. The casing portion 12 is provided with a lock function by furnishing with a guide groove 23 above the lock rod groove 27 for receiving a locking assembly 13; the casing portion 12 also has a cylinder base 20 for mounting a lock cylinder 14. Between the cylinder base 20 and the positioning groove 25, there is a through hole to serve as a screw seat 21.

Before the upper and lower casings 12A and 12B are assembled together, the lock cylinder 14 has to be mounted in the upper casing 12A first with the screw 22; the locking assembly 13 is mounted in the guide groove 23. The rear end of the locking rod 15 has a round hole 45 for receiving a positioning pin 46; each of the two symmetrical grooves 32 in the upper and lower casings 12A and 12B is mounted with an anti-drilling plate 34.

The positioning groove 25 furnished between the upper and lower casings 12A and 12B is designed to fit the shape of the elongate oblong rod 50, of which both sides are furnished with symmetrical positioning ribs 28 to be mated with the corresponding retaining grooves 51 on both sides of the elongate oblong rod 50. When the upper and lower casings 12A and 12B are assembled together, the elongate oblong rod 50 and the casing portion 12 will also be assembled together by means of the symmetrical positioning ribs 28. The end of the elongate oblong rod 50 for fastening the casing portion 12 is an opening and hollow pipe; the height of the hollow portion of rod 50 is slightly larger than the thickness of the locking rod 15 so as to form free passage for the locking rod 15; the other end of the elongate oblong rod 50 is closed, and covered with a protection sleeve 52.

The L-shaped locking plate 17 is attached to the casing portion 12; the vertical side 49 of the plate 17 has four round holes 48 on both sides thereof, and such round holes are corresponding to screw holes 36 furnished on the upper and lower casings 12A and 12B so as to facilitate the L-shaped locking plate 17 to be fastened to the casing portion 12 with screws 39. The center of the vertical side 49 of the plate 17 has a through hole 47 corresponding to the locking rod groove 27 of the casing portion 12 to facilitate the locking rod 15 to move back and forth. The horizontal side 40 of the plate 17 and both sides thereof are formed into a curved shape, which is covered with a protection sleeve 53; the width of the protection sleeve 53 is smaller than the internal width of the L-shaped hooks 16 on the end of the locking rod 15; after the device 11 is locked up to a steering wheel, the horizontal side 40 will hold the bottom of the grip wheel 61.

Figure 11:
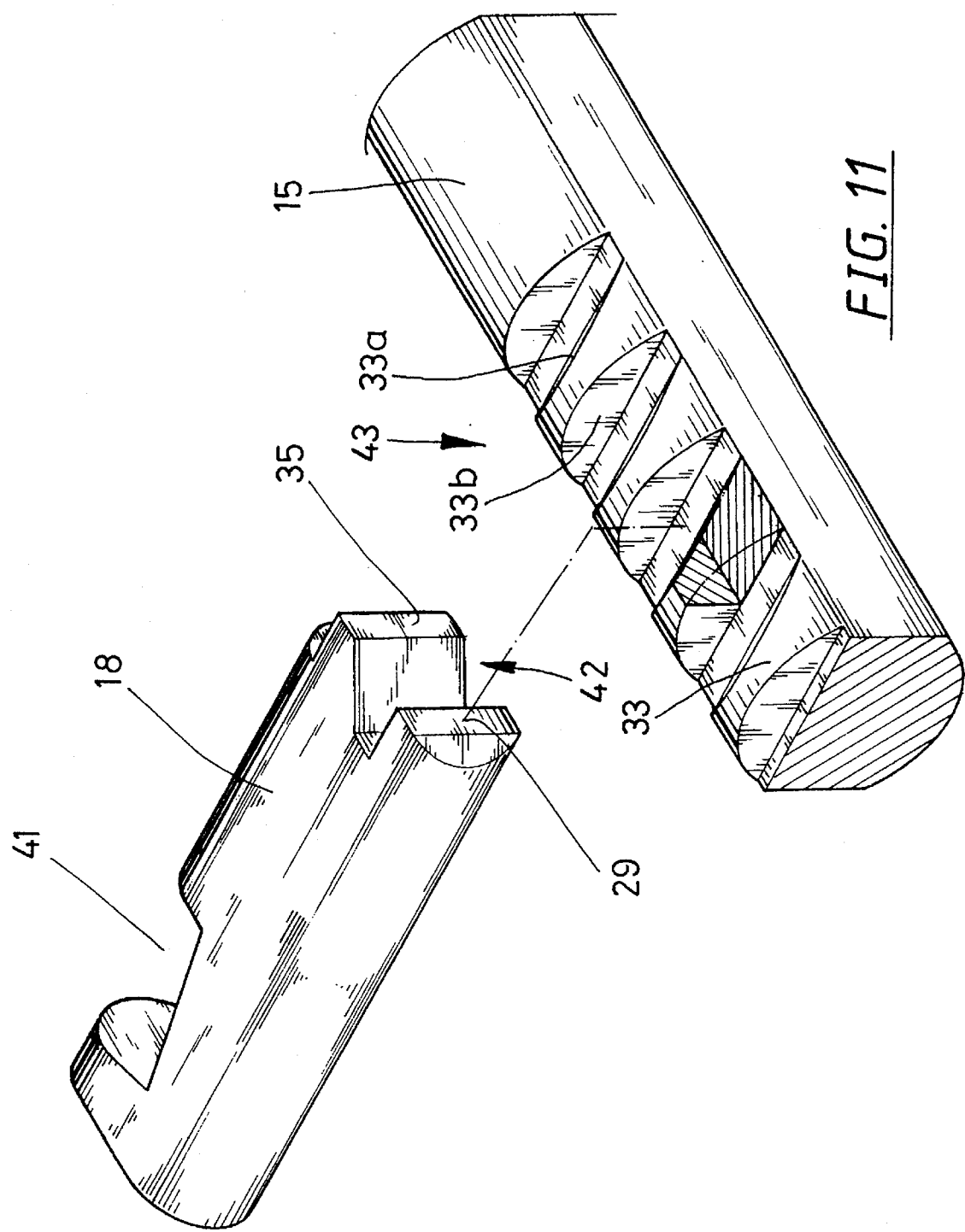
FIG. 11 is a fragmental perspective view of the present invention, showing the structure between the latch and the locking rod thereof.

The locking rod 15 is a solid rod, having two parallel sides and two symmetrical curved top and bottom sides; one end of the rod 15 is welded to the center of the L-shaped hooks 16 so as to hook the grip wheel 61 of a steering wheel; the other end of the rod 15 is a free end, passing through the lock rod groove 27 and extending into the elongate oblong rod 50. The top curved side of the rod 15 is furnished with a plurality of locking grooves 43 and detent teeth 33 nearing the locking hook 16. Referring to FIG. 11, each of the detent teeth 33 has a vertical side 33b facing the locking hook 16, and a bevel side 33a of 45 degrees facing the free end of rod 15; such teeth 33 are engaged with the locking assembly 13 in the casing portion 12 for a positioning function. On the top side of the rear end of locking rod 15, there are two positioning grooves 44, which are the same in shape as the locking grooves 43, and are used to furnish a positioning function for the casing portion 12 upon being pulled out. The rear end of locking rod 15 has a round hole 45 for receiving a positioning pin 46. When the locking rod 15 is pulled out, the positioning pin 46 engages a stair portion between the positioning groove 25 and the locking rod groove 27 to prevent the locking rod 15 from being separated out of the casing portion 12.

The upper casing 12a has a guide groove 23 for the locking assembly 13 and a cylinder base 20 for the locking cylinder 14 above the locking rod groove 27; the guide groove 23 and the cylinder base 20 are in communication each other so as to provide the locking function between the locking rod 15 and the casing portion 12. The guide groove 23 for the locking assembly 13 is designed for fitting the oblong-shaped latch 18 therein; the top of the oblong-shaped latch 18 is flat, while the lower end thereof has several stop teeth 42; one side of the oblong-shaped latch 18 that faces the cylinder base 20 has a slash cut 41 to engage with a transmission pin 19 of the lock cylinder 14. The top of the guide groove 23 is mounted with an anti-drilling piece 37 and a spring 38 normally pushing against the latch 18 downwards. As soon as the anti-theft device 11 is locked up to a car steering wheel, the stop teeth 42 of the latch 18 will engage with the locking grooves 43 closely. The device 11 can be unlocked by turning the lock cylinder 14, and the transmission pin 19 will drive the latch 18 to move upwards so as to have the stop teeth 42 of the latch 18 disengaged from the detent teeth 33 of the locking grooves 43.

The stop teeth 42 of the latch 18 include an anti-theft tooth 29 and a positioning tooth 35; the anti-theft tooth 29 is on the front side, while the positioning tooth 35 is on the rear side of the latch 18. Referring to FIG. 11 again, the anti-theft tooth 29 has a round bevel side of 45 degrees to be in contact with the bevel side 33a of the locking grooves 43, while the rear side of the anti-theft tooth 29 is a vertical side to be engaged with the vertical side 33b of the locking grooves 43 on the locking rod 15. The front edge of the positioning tooth 35 is a bevel side of 45 degrees to be in contact with the bevel side 33a of the locking grooves 43 on the locking rod 15; the vertical side of the positioning tooth 35 is to be engaged with the vertical side 33b of the locking grooves 43 so as to provide a better anti-theft function between the locking assembly 13 and the locking grooves 43 of the locking rod 15. In case of an incorrect tool being used to pick the device, it would be impossible to have the latch 18 moved up because of the stop teeth 42 of the casing portion 12 being closely engaged with the detent teeth 33 of the locking rod 15, and the anti-theft tooth 29 and the bevel side 33a of the detent teeth 33 being engaged closely, and therefore the device can not be unlocked; then, the anti-theft function is fulfilled.

Before the anti-theft device is locked up to a steering wheel as shown in FIGS. 1 to 5, the locking assembly 13 should be unlocked first so as to pull the locking hook 18 away from the casing portion 12 at a suitable distance; then, put the outer hook 55 around the spoke 63 of a steering wheel 60, and push the outer hook 55 to the bottom side of the grip wheel 61, and let the side-vertical rod 57 contact with the inner side of the grip wheel 61, and with both sides of the spoke 63, while the upper lateral rod 56 rests on the top side of the spoke 63; the locking rod 15 welded at the center of the locking hook 16 is mounted on the top of the grip wheel 61. The casing portion 12 and the locking rod 15 form a guide and one-way fastening function. Push the casing portion 12 to the steering wheel 60 until the horizontal side 40 of the L-shaped locking plate 17 on the casing portion 12 being in contact with the bottom side of the grip wheel 61. After the anti-theft device 11 is mounted on a steering wheel by means of the locking hook 16, the locking rod 15 and the L-shaped locking plate 17, the elongate oblong rod 50 extends from the steering wheel 60; in case of the steering wheel 60 being cut with a saw, the spoke 63 and the anti-theft device 11 still have a given length to prevent a burglar from turning the steering wheel freely to drive the car away.

Figure 6:
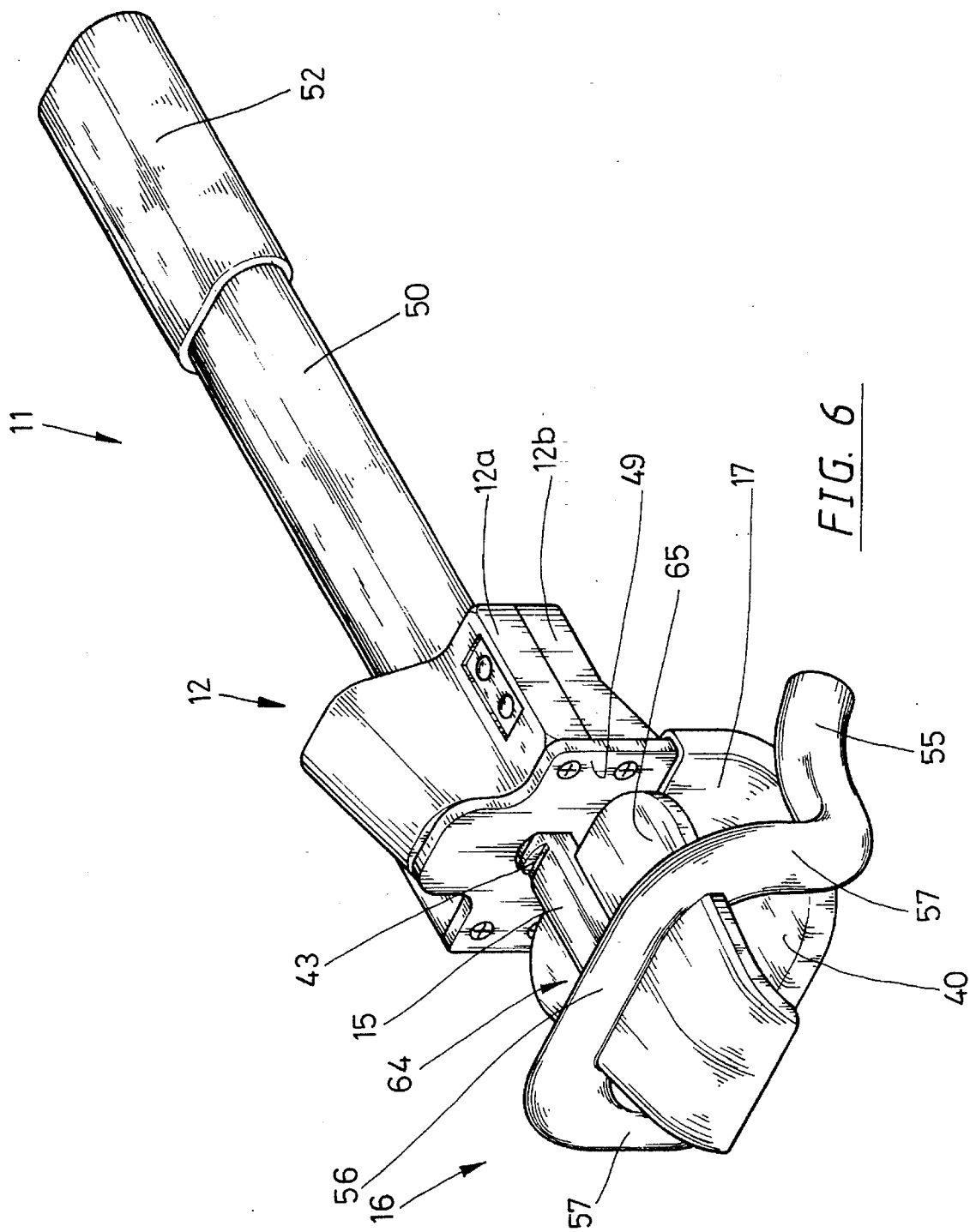
FIG. 6 is a perspective view of the present invention, showing a reinforced press plate being added to the present invention.

In order to increase the fastening function between the spoke 63 and the grip wheel 61, a reinforced press-plate 64 is welded under the locking rod 15 and the upper lateral rod 56 as shown in FIG. 6; such reinforced press-plate 64 includes two embodiments, of which one such plate is welded under the bottom of the locking rod 15 and the upper lateral rod 56, extending a given length out of the upper lateral rod 56, so as to reinforce the anti-theft device, while other such plate is welded under the locking rod 15 and the upper lateral rod 56 as an inner press-plate 65 so as to prevent the grip wheel 61 of a steering wheel from being cut with a saw.

Figure 7:
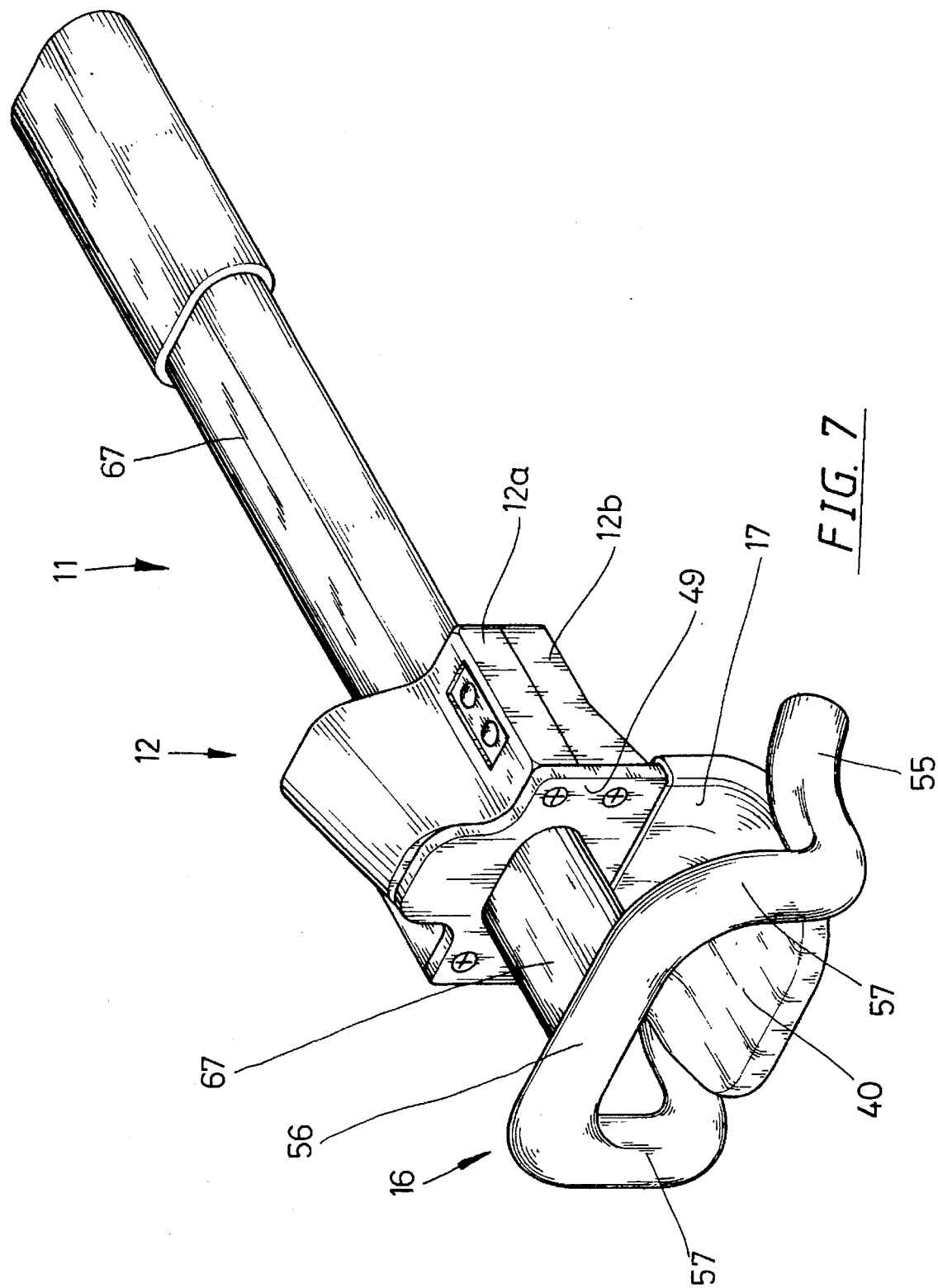
FIG. 7 is a perspective view of the present invention, showing an oblong hollow rod thereof.
Figure 8:
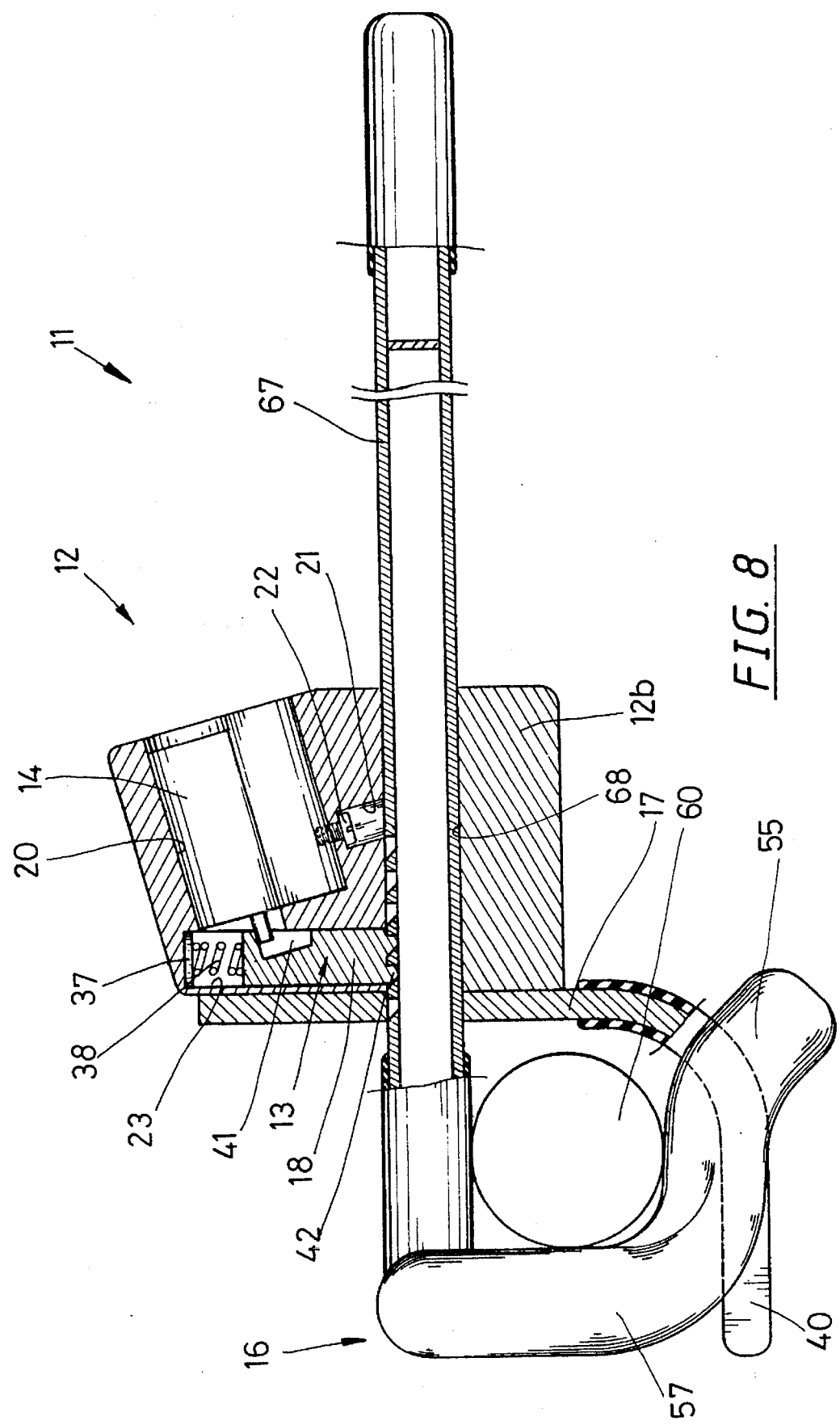
FIG. 8 is a sectional view of the present invention, showing the structure of the oblong hollow rod thereof.

In addition to the locking rod 15 in the aforesaid embodiment being mounted between the locking hook 16 and the casing portion 12 to serve as a guide and locking means, another embodiment of the locking rod is an oblong hollow rod 67 as shown in FIGS. 7 and 8, in which an oblong passage 68 is used for replacing the positioning grooves 25 and the lock rod groove 27 in the upper and lower casings 12A and 12B; one end of the oblong hollow rod 67 is welded to the center of the upper lateral rod 56, while the other end thereof is a closed end. Nearing the locking assembly 13, there are locking grooves 69 to be engaged with the stop teeth 42. The oblong hollow rod 67 can provide the casing portion 12 with guide and locking function.

Figure 9:
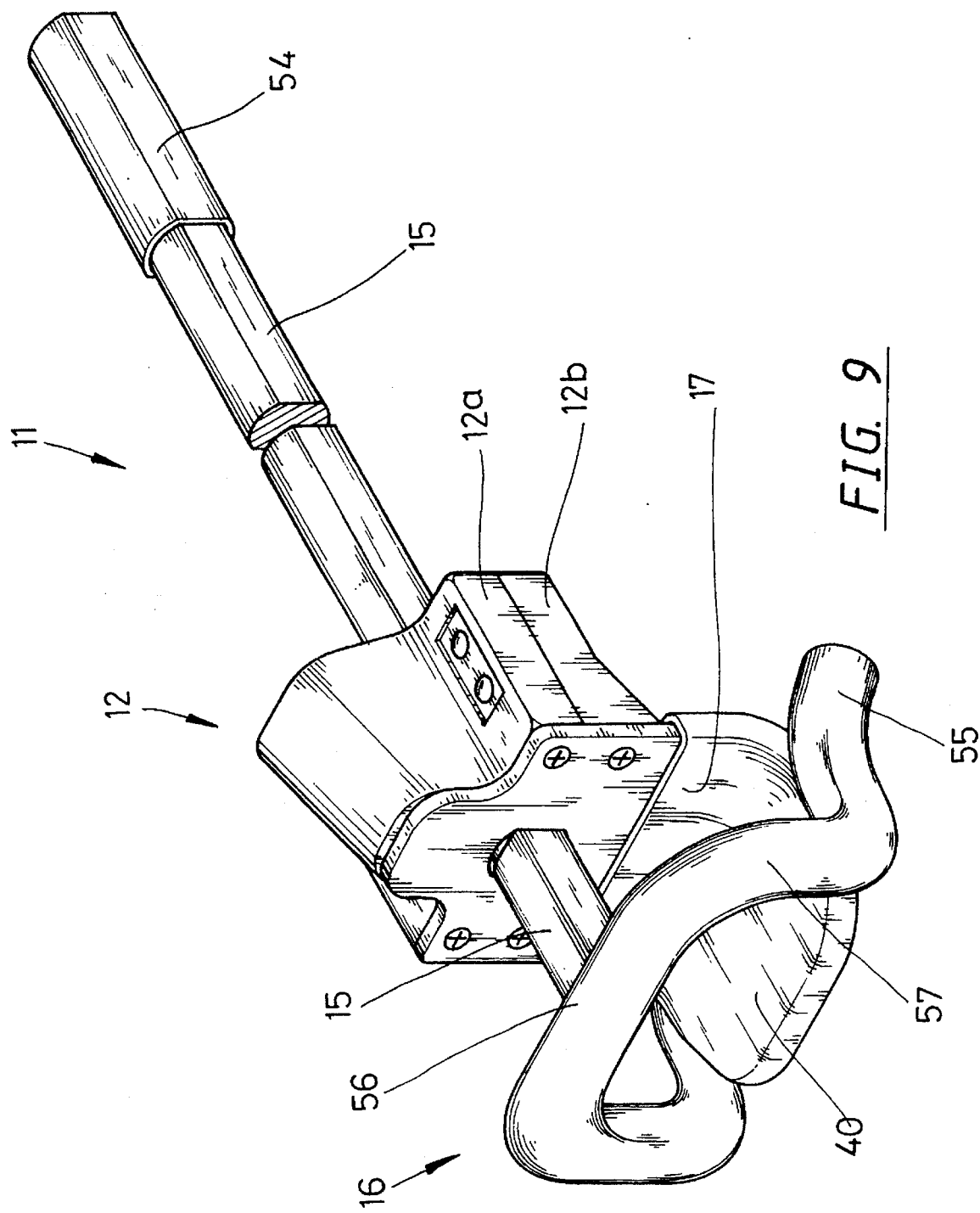
FIG. 9 is a perspective view of the present invention, showing the locking rod extended at a given length.
Figure 10:
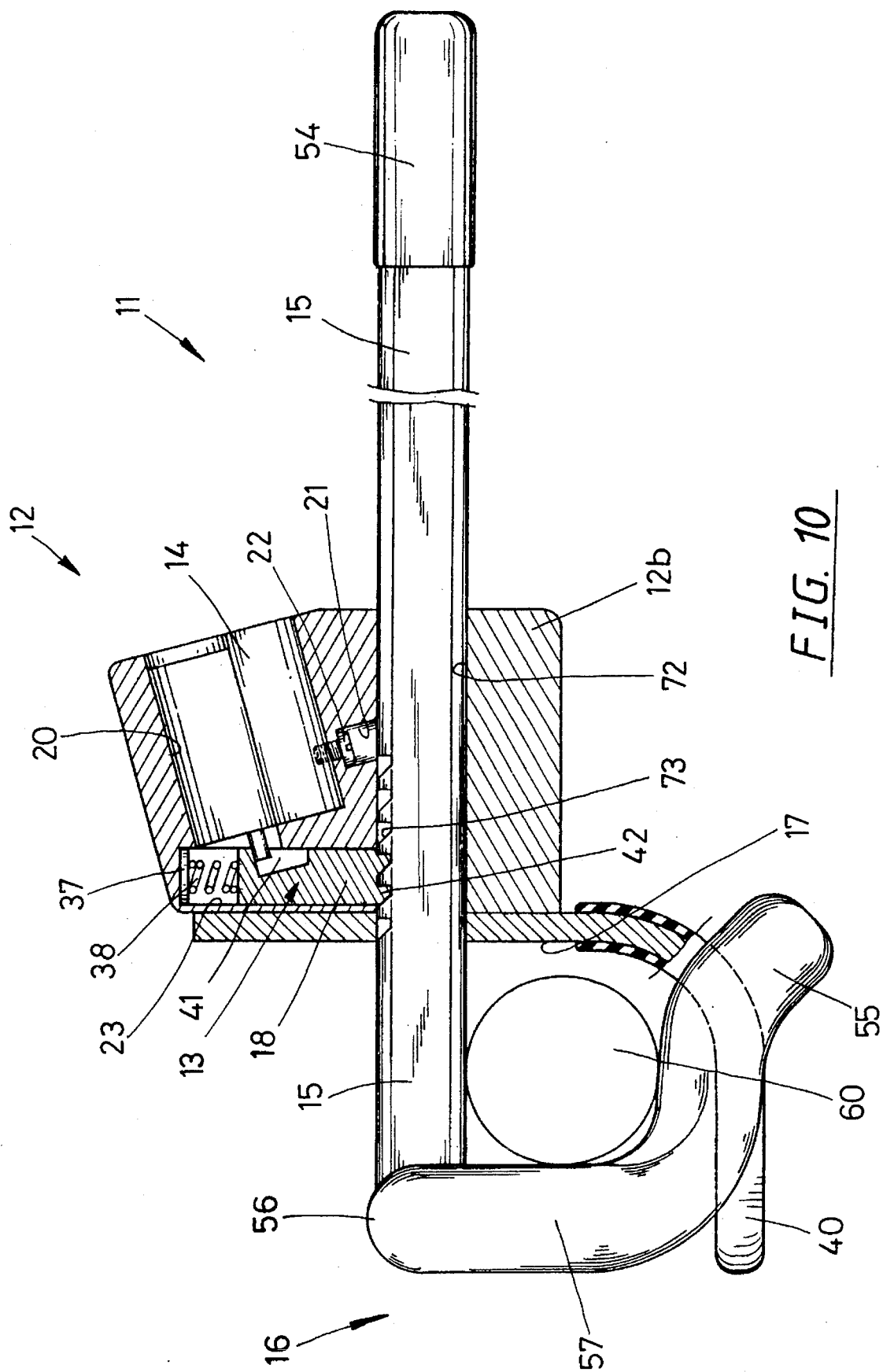
FIG. 10 is a sectional view of the present invention, showing the locking rod extended at a given length.

As shown in FIGS. 9 and 10, the locking rod 15 for guide and locking function is mounted through an oblong passage 68, which has two parallel sides and two curved top and bottom sides, to replace the positioning grooves 25 in the upper and lower casings 12A and 12B, and the lock rod groove 27 as shown in FIG. 3; the locking rod 15 extends through the oblong passage 68 at a given length, and the outer end of the locking rod 15 is mounted with a protection sleeve 54. The locking assembly 13 has stop teeth 42 to be engaged with the locking grooves 73 to achieve a locking function. The solid locking rod 15 can directly provide a guide and locking function.

The embodiments of the present invention have been described respectively; it is apparent that the present invention is an improved device of the conventional anti-theft device for car in terms of practical performance and structure thereof.

I claim:

1. An anti-theft device for an automobile comprising:

an elongate oblong rod having an extended outer end and an inner end mounted in a lock rod groove formed in upper and lower casings in a casing portion;

said casing portion including an upper casing and a lower casing, both said upper and lower casings having symmetrical locking rod grooves, said upper casing having a guide groove to receive a locking assembly, and also having a cylinder base to receive a lock cylinder, said cylinder base and said guide groove being in communication with each other, and a screw seat furnished under said cylinder base;

a lock cylinder received in said cylinder base and used for unlocking said anti-theft device when said lock cylinder is fastened in place with a screw extending through said screw seat, said lock cylinder having a transmission pin;

a latch movably received in the guide groove and having a slash cut engaged by said transmission pin;

a plurality of rivets fastened in riveting holes respectively in said upper and lower casings;

said locking assembly mounted in said upper casing, and including an anti-drilling piece, a spring and said latch, said anti-drilling piece fitted in a closed end of said guide groove, said spring being mounted between said anti-drilling piece and said latch, said latch having said slash cut facing said cylinder base, and having stop teeth facing an open end of said guide groove, such that said stop teeth engage locking grooves on a locking rod;

a L-shaped locking plate having a vertical side and a horizontal side, said vertical side having a plurality of holes corresponding to a plurality of screw holes on said upper and lower casing, a center of said vertical side having a through hole corresponding to said locking rod grooves in said upper and lower casings, the width of said horizontal side of said L-shaped locking plate being smaller than a distance between two vertical side rods of a lock hook, a space formed by means of said vertical side, said horizontal side and said locking rod so as to mount the anti-theft device around the grip wheel of a steering wheel;

said locking rod being an elongate rod, of which one end is attached to a center of a locking hook, while the other end thereof is fitted in said locking rod grooves of said upper and lower casings, a top side of said locking rod having a plurality of locking grooves near said casing portion having a beveled side and a vertical side, said locking grooves also having a plurality of detent teeth;

a symmetrical L-shaped hook including two vertical side rods extending from an upper lateral rod, and two outer hooks extending from said two side-vertical rods, a center of said upper lateral rod being attached to said locking rod, such that said symmetrical L-shaped hooks and said locking rod form a space for receiving a spoke of steering wheel; and, said latch mounted in said guide groove in said upper casing having an anti-theft tooth and a positioning tooth, said anti-theft tooth having a first bevel side of 45 degrees and a first vertical side, said first bevel side being smaller than that of a corresponding beveled side of said locking grooves on said locking rod, said positioning tooth having a second bevel side of 45 degrees and a second vertical side.

2. An anti-theft device for an automobile as claimed in claim 1, wherein a groove between said upper and lower casings includes a positioning groove for receiving an elongate oblong rod, and a locking rod groove having two parallel sides and curved top and bottom sides for receiving said locking rod, both sides of said elongate oblong rod having retaining grooves to be engaged by symmetrical positioning ribs in said upper and lower casings, said locking rod groove having two parallel sides and curved top and bottom side, and said upper casing having a guide groove for receiving a locking assembly.

3. An anti-theft device for an automobile as claimed in claim 2, wherein said elongate oblong rod between said positioning groove of said upper and lower casings comprises an oblong hollow rod, and said locking rod between said locking rod groove said upper and lower casings is a solid rod having two parallel sides and curved top and bottom sides, the height between said curved top and bottom sides being smaller than an inner height of top and bottom sides of said oblong hollow rod, whereby said inner height of said oblong hollow rod defines a passage allowing said solid rod to move freely therein.

4. An anti-theft device for an automobile as claimed in claim 2, wherein a locking rod groove receives said locking rod and said positioning groove receives said oblong hollow rod between said upper and lower casing, one side of said locking rod having a round hole for receiving a positioning pin which contacts a stair portion of the casing between said positioning groove and said lock rod groove.

5. An anti-theft device for an automobile as claimed in claim 1, wherein said locking rod groove between said upper and lower casings comprises a single passage having the same shape as that of said oblong hollow rod.

6. An anti-theft device for an automobile as claimed in claim 1, wherein the locking rod groove between said upper and lower casings comprises a single passage having the same shape as that of said locking rod with two parallel sides and symmetrical curved top and bottom sides, the top side of said locking rod furnished with a plurality of locking grooves to be engaged with said locking assembly.

7. An anti-theft device for an automobile as claimed in claim 1, wherein said locking rod comprises a solid rod having two parallel sides and symmetrical curved top and bottom sides, the top side of said locking rod furnished with a plurality of locking grooves and detent teeth, and each of said detent teeth having a vertical side facing said locking hook, and a bevel side of 45 degrees facing the free end of said locking rod.

8. An anti-theft device for an automobile as claimed in claim 1, wherein the guide groove in said upper casing of said casing portion is an elongate hole and wherein the latch has two parallel sides and symmetrical curved front and rear sides to be fitted in said guide groove, a lower end of said latch having a detent teeth to be engaged with said locking grooves on said locking rod.

9. An anti-theft device for an automobile as claimed in claim 1, further comprising a reinforced press-plate attached inside and under a joint between said upper lateral rod and said locking rod.

10. An anti-theft device for automobile as claimed in claim 1, wherein a reinforced press-plate is welded inside and under the joint part of said upper lateral rod and said locking rod; said reinforced press-plate extended out of said upper lateral rod at a suitable length.

* * * * *